Sept. 5, 1950               R. KEITLEY               2,521,522
RECTIFIER MEASURING CIRCUIT
Filed March 19, 1947
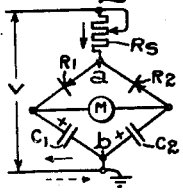
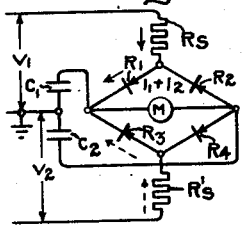
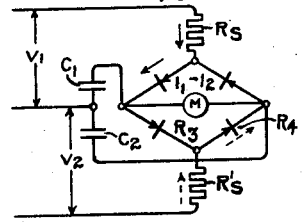
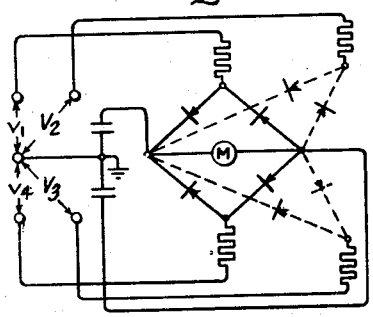
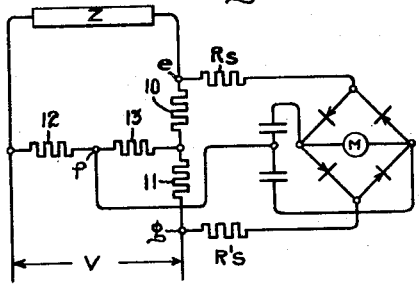
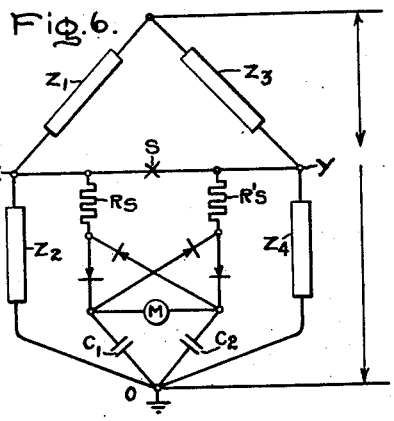
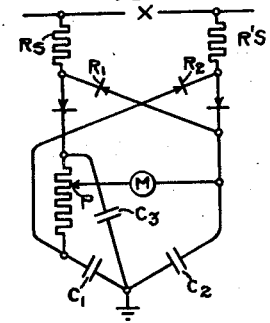
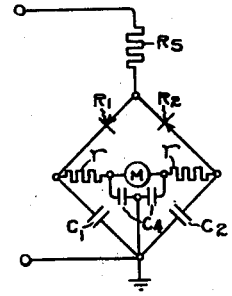
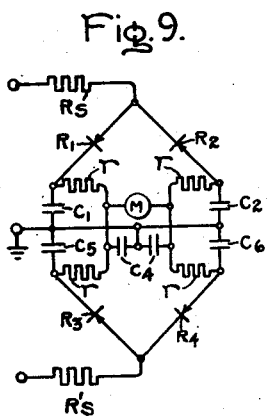
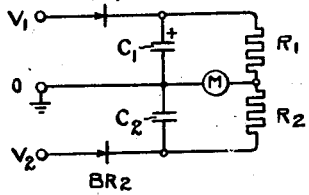
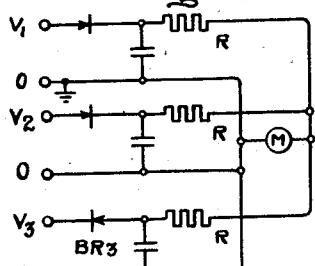
Inventor:
Robert Keitley,
by *Prowell S. Mack*
His Attorney.

Patented Sept. 5, 1950

2,521,522

UNITED STATES PATENT OFFICE 2,521,522

RECTIFIER MEASURING CIRCUIT

Robert Keitley, Rugby, England, assignor to General Electric Company, a corporation of New York Application March 19, 1947, Serial No. 735,655
In Great Britain April 5, 1946

4 Claims. (Cl. 171—95)

This invention relates to circuit arrangements for measuring A.-C. voltages of any frequency.

A bridge arrangement of four rectifiers of the barrier layer type is well known in connection with the measurement of A.-C. curents and voltages. The voltages to be measured are applied to diagonally opposite points of the bridge, while a D.-C. measuring instrument is connected between the remaining diagonally opposite points, the rectifiers being so poled that direct current flows through the instrument. Such an arrangement is suitable for measuring A.-C. currents or voltages, the inclusion of a series resistance in the connection from the source of voltage or current which is to be measured to one of the diagonals of the bridge being made when voltages are to be measured. The value of the resistance is changed to accord with the range of the voltage to be measured, the current measuring instrument being calibrated to indicate voltages by reason of the current variation produced by varying voltages applied to the selected value of resistance. One disadvantage of such an arrangement resides in the fact that there are two rectifiers in series for each direction of current flow with the result that the minimum current or voltage capable of being measured is limited.

It is the object of the present invention to provide an arrangement which is an improvement over that above mentioned.

One circuit arrangement for the purpose set forth comprises a pair of barrier layer rectifiers connected in series for the same direction of current flow and arranged in parallel with a D.-C. measuring instrument, and connections to the circuit in which is developed the voltage to be measured, one of said connections being made to the common connection of the two rectifiers and the other of said connections being made to the common connection between a pair of condensers connected in series across the instrument, one of the said connections including a resistance, the value of which is dependent upon the current to be passed through the instrument.

Owing to the presence of the two condensers in series across the instrument and to the insertion of the rectifiers, opposite half cycles of the applied A.-C. E.M.F. will cause to be built up on the condensers charges which are in series with one another, the charges on the condensers causing a direct current to flow through the instrument which is a measurement of the applied A.-C. voltage.

In the improved arrangement there is thus present in the paths, through which opposite half cycles of the current produced by the applied A.-C. E.M.F. are passed, only a single rectifier, and the minimum voltage necessary to produce current flow through the said paths is thus reduced.

When the circuit is used for measuring A.-C. voltages of such frequency that the condensers present a substantially short-circuit path at the frequencies at which the measuring is to be effected, the condition is present that at such frequencies both the current measuring instrument and one supply lead are at earth potential for the high frequency.

The arrangement is thus suitable for providing an indication or measurement of the sum or difference of two or more A.-C. voltages. In such an arrangement for every additional A.-C. voltage to be added or subtracted there is placed in parallel with the instrument a pair of barrier-layer rectifiers connected in series for the same direction of current flow, connections to the circuit in which the additional A.-C. voltage is developed being made to the common connection of the two added rectifiers and the other connection between the pair of condensers which are connected in series across the instrument. According to the polarity in which the additional pair of rectifiers is connected, each additional voltage can be made to pass, through the instrument, a direct current in such a direction as to add or subtract from the D.-C. present as a result of the first voltage, the current flowing through the instrument thus being indicative of the sum or difference of the applied A.-C. voltages.

The arrangement is also suitable for obtaining a measure of the power consumed by an impedance. In this arrangement suitable voltage dropping or transforming networks are employed to produce E.M.F.'s the instantaneous values of which are proportional, respectively, to the instantaneous value of the voltage across, and the curent through, the impedance. The sum of these two voltages is applied to one branch of the rectifier and the difference to another, in such manner that the reading of the indicating instrument is made proportional to the power consumed by the impedance.

The arrangement may also be applied for the purpose of indicating accurately the balance of a bridge circuit. In this case the indicator must be rendered sensitive in the neighborhood of zero E.M.F. across the point of balance, and by the use of the improved bridge arrangement this may readily be achieved.

Another rectifier condenser charging arrangement is described for adding or subtracting A.-C. voltages using only one rectifier for each of the voltages to be dealt with.

The invention will now be described with reference to the accompanying drawings, in which Fig. 1 shows the basic circuit of the present invention; Figs. 2 and 3 represent, respectively, arrangements for providing an indication of the sum and difference of two A.-C. E.M.F.'s; Fig. 4 shows an extension of the arrangement shown in Figs. 2 and 3 for more than two E.M.F.'s; Fig. 5 is an arrangement for measuring the power consumed by an impedance; Fig. 6 is an arrangement for utilizing the invention for indicating the state of balance of an impedance bridge; Fig. 7 is a modification of Fig. 6; Fig. 8 shows a modification aimed at reducing the value of the series resistance which determines the current flowing through the instrument; Fig. 9 is a further modification; and Figs. 10 and 11 show condenser charging rectifier arrangements for adding or subtracting voltages where only a single rectifier is used for each voltage to be dealt with.

Referring first to Fig. 1, which shows the basic circuit of the invention, there are provided a pair of barrier layer rectifiers $R_1$, $R_2$ connected in series for the same direction of current flow and arranged in parallel with a D.-C. measuring or indicating instrument M. Connected also in series with one another, and in parallel with the instrument M, are condensers $C_1$ and $C_2$. Connections to the circuit across which the voltage V to be measured is developed are made to the common connection point $a$ of the rectifiers $R_1$, $R_2$ and to the common connection point $b$ between the condensers $C_1, C_2$. In series with one or other of these connections is provided a resistance $R_s$ the value of which is determined by the current to be passed through the instrument. Resistance $R_s$ may be made adjustable, if desired, to vary the range of voltage to be measured or indicated. The point $b$ may be, and preferably is, connected to earth as indicated.

The operation of the circuit is as follows: Alternate half cycles of the applied voltage are passed in the direction of the full line arrow through the rectifier $R_1$ and build up a positive charge indicated on the condenser $C_1$, while the remaining half cycles flow in the direction of the interrupted line arrows to rectifier $R_2$ and develop a positive charge indicated on condenser $C_2$. These charges cause a current to flow through the measuring instrument M, which is such as to maintain the average charge on the condensers at a value proportional to the voltage V, and which is thus a measure of the voltage V. According to the value of the applied voltage to be measured, an adjustment of the value of resistance $R_s$ is made so as to keep the current flow through the instrument M within the scale reading of the instrument.

It is evident that when the arrangement is used for measuring A.-C. voltages of such frequency that the condensers $C_1, C_2$ present a substantially short-circuit path at that frequency, both the instrument and one supply are at earth potential for the high frequency.

Referring now to Fig. 2 I have shown a modification of the arrangement illustrated in Fig. 1 adapted for the purpose of measuring the sum of two voltages $V_1, V_2$. For this purpose there are provided in parallel with the instrument M a further pair of rectifiers $R_3, R_4$ connected in series for the same direction of current flow, the connection to the circuit in which the additional voltage $V_2$ is developed being made, respectively, to the common connection of rectifiers $R_3, R_4$ and to the common connection of condensers $C_1, C_2$, which thus constitutes a common connection of the two circuits in which the voltages $V_1, V_2$ are developed. The connection to the common connection of rectifiers $R_3, R_4$ may be made through a resistance $R'_s$, the value of which is dependent on the voltage $V_2$ to be added, and thus is preferably of like value to that of resistance $R_s$. In the arrangement shown, alternate half cycles of the A.-C. voltage $V_2$ flow in the direction of the interrupted line arrows through rectifier $R_3$ and build up a positive charge on condensers $C_1$ in a similar manner to that in which the corresponding voltage is obtained from the circuit in which voltage $V_1$ is developed, while the remaining half cycles build up a positive charge through rectifier $R_4$ on the condenser $C_2$. It will be seen that these charges are of the same polarity in the two condensers, so that the current flow through the instrument M represents the sum of the currents $I_1$ and $I_2$ produced by the voltages developed on the condensers $C_1, C_2$ and is thus indicative of the sum of the voltages $V_1, V_2$.

If, as shown in Fig. 3, the polarity of the rectifiers $R_3, R_4$ is altered, the current flow through the instrument M is proportional to the difference in the charges built up on the condensers $C_1, C_2$ and is thus indicative of the difference between voltages $V_1, V_2$.

Fig. 4 shows how the arrangement indicated in Fig. 2 can be extended to indicate the algebraical sum of four voltages, each voltage being applied to the instrument M through a pair of rectifiers connected in series for the same direction of current flow and arranged in parallel with the instrument M.

Referring now to Fig. 5, I have shown an arrangement which is adapted to indicate the power consumed by an impedance Z connected to a circuit across which voltage V is developed. In this arrangement, I provide a resistance network consisting of resistances 10, 11 in series with impedance Z and resistors 12, 13 connected across the circuit in parallel with the impedance. Across each of resistances 10, 11, assuming them to be equal, there will be developed a voltage $v_1$ proportional to the current flow through impedance Z, while across resistor 13 will be developed a voltage $v_v$ proportional to the voltage across the impedance. Between points E and F there will then exist an E.M.F. proportional to $v_v + v_1$, while between points F and G there will be developed an E.M.F. proportional to $v_v - v_1$. The E.M.F. between points E, F and F, G is now applied to a circuit arrangement similar to that shown in Fig. 3.

In addition the voltage and current levels and rectifier and circuit constants are adjusted so that the component rectified currents are proportional to the square of the voltages producing them, and equal voltages applied to either element produce equal rectified currents. This may be arranged owing to the square law characteristic of the rectifier when operating at low current levels.

Thus current through indicating instrument M
$a(v_1+v_v)^2 - (v_1-v_v)^2$
$av_1v_v$
$aIV$ where I and V are instantaneous values of the main current and voltage.

IV = instantaneous power absorbed by impedance voltage.

The indication of the instrument is then proportional to the mean value of this power over a complete cycle.

Turning now to Fig. 6, I have indicated the use of an arrangement such as in Fig. 3 for the purpose of indicating the position of zero voltage across the diagonals of an impedance bridge circuit formed by impedance $Z_1$ to $Z_4$. When it is desired to indicate accurately the balance in a bridge, the indicator connected across the points of balance must be sensitive in the neighborhood of zero volts. By connecting the improved measuring circuit across the points of balance, as indicated in Fig. 6, this high sensitivity is obtained, and furthermore, the indicating instrument is operated at earth potential, thus simplifying screening and balancing of stray capacities. In the connection across the diagonals of the bridge there is inserted a switch S which, when closed, short-circuits the diagonals and enables any out-of-balance current in the rectifying circuit to be indicated. On opening the switch S, the condition of balance of the bridge is then indicated when the deflection of the instrument M is the same as the deflection, if any, when the switch S is closed.

In effect the rectifying circuit obtains an indication of the difference in potential between points $x$, $0$ and $y$, $0$ and thus indicates when $x$ and $y$ are at the same potential. Furthermore, the rectifying circuit can be arranged to operate with both potentials at a sufficiently high value to give efficient operation.

In Fig. 7 means are indicated whereby the adjustment of the rectifying and indicating circuit may be obtained. In this arrangement the connection to one side of the instrument is made to the moving arm of a potentiometer P to the lower side of which rectifier $R_2$ is connected, the upper end of the potentiometer being connected to earth through a condenser $C_3$.

When it is desired to obtain the highest operating frequency limit, it is necessary to reduce the value of the series fed resistance $R_s$ to the lowest value consistent with adequate protection of the crystals against transient and steady overloads. This reduction of the value of $R_s$ is desirable first, to reduce effect of unavoidable rectifier and other shunt capacities, and second, because resistors with adequate constancy of characteristics at high frequencies are difficult or impossible to obtain. With reduction of the value of $R_s$, however, low input impedance is obtained. To avoid this disadvantage as shown in Fig. 8, I insert resistors $r$ in series with the instrument in order to restore the input impedance to the high value required without substantial change in the frequency limit. The performance of this modified circuit is now intermediate between peak and mean reading so that it is in general limited to use with sine wave sources or for comparison of sources with identical wave forms. If desired, condensers $C_4$ may be inserted at the terminals of the instrument M to ensure that that is effectively operated at earth potential.

In Fig. 9 a further modification is disclosed, wherein, by the use of two pairs of condensers, full wave rectification can be obtained with the summation or subtraction of two voltages. In this arrangement, additional condensers $C_5$ and $C_6$ are employed, condensers $C_1$ and $C_2$ corresponding to the similarly indicated condensers in Fig. 1, while the lower half of the figure below the earth connection constitutes a mirror image of the circuit above the earth connection, condensers $C_5$ and $C_6$ and resistors $R_3$ and $R_4$ and resistors $r$ corresponding with the appropriate components in Fig. 1. The arrangement is such that the current flowing through the instrument M is proportional to the sum of the voltages $V_1$, $V_2$ developed across the terminals indicated.

It will be evident that by alteration in the polarity of rectifiers $R_3$, $R_4$ the circuit arrangement of Fig. 9 may be utilized to indicate the difference between voltages $V_1$ and $V_2$, as explained in connection with Fig. 3.

Referring to Fig. 10, there is indicated a condenser $C_1$ connected in series with the rectifier $BR_1$ to a source of A.-C. voltage $V_1$, one of the terminals of which is indicated as being earthed. By the inclusion of the rectifier $BR_1$ a charge is built up on condenser $C_1$ having the polarity indicated. I then connect across the condenser a resistor $R_1$ and a measuring instrument M in series. There thus flows through the instrument M a direct current which is proportional to the charge built up on the condenser $C_1$, which thus varies as the voltage $V_1$ is derived from the source. The principle is the same as in Fig. 1 except that only one-half of the A.-C. voltage wave is utilized.

I now provide a mirror image of the circuit above described and consisting of rectified $BR_2$, condenser $C_2$ and resistor $R_2$ connected as indicated. Through the resistor $R_2$ there thus flows a discharge current from the condenser $C_2$ which adds to the discharge current from the condenser $C_1$ so that the current through the instrument M is a meaure of the sum of the voltages $V_1$, $V_2$ derived from the appropriate source. In addition to limiting discharge currents to condensers $C_1$, $C_2$, resistors $R_1$, $R_2$ also serve to provide a high impedance path in series with the rectifiers and the instrument M. It will be seen that by reversing the polarity of rectifier $BR_2$, the current through the instrument will be proportional to $V_1 - V_2$.

Fig. 11 shows an arrangement similar to that shown in Fig. 10, in which the addition or subtraction of a current proportional to a third voltage $V_3$ can be passed through the instrument so that the latter is adapted to indicate the algebraical sum of three voltages $V_1$, $V_2$, $V_3$, or whether or not one of them is negative. It will be observed that the rectifier $BR_3$, associated with the circuit in which the voltage $V_3$ is developed, is connected for reverse polarity in the circuit so as to provide current through the instrument M which is proportional to $-V_3$.

In carrying out the invention I preferably use barrier layer rectifiers employing silicon, germanium, or selenium as the barrier layer. Barrier layers employing these metals provide limited resistance to reverse current flow and limited capacity to withstand transient electric potentials such as switching surges. The series resistance $R_s$ included in the circuit for the purpose of range variation will thus provide adequate protection against such surges.

What I claim as new and desire to secure by Letters Patent of the United States, is:

1. Rectifier measuring apparatus comprising at least four parallel connected circuits, one such circuit containing a direct current measuring instrument, another such circuit containing a pair of series connected condensers and the remaining such circuits each containing a pair of barrier layer rectifiers connected in series for the same direction of current flow and terminals for connecting said measuring apparatus to circuits jointly to be metered thereby, there being one such terminal between each of said pairs of rectifiers and between said pair of condensers.

2. Rectifier apparatus for obtaining a measurement proportional to the sum of two alternating currents comprising four parallel circuits, one such circuit containing a direct current measuring instrument, two such circuits containing a pair of rectifiers connected in series for the same direction of current flow and the other such circuit containing a pair of series connected condensers and terminals for connecting one of the circuits to be metered between said pair of condensers and one pair of said rectifiers and for connecting the other circuit to be metered between said pair of condensers and the other pair of rectifiers, said two rectifier circuits being connected to send current in the same direction through the measuring instrument.

3. Rectifier apparatus for measuring the difference between two alternating currents comprising four circuits connected in parallel, one such circuit containing a direct current measuring instrument, two of such circuits each containing a pair of rectifiers connected in series for the same direction of current flow and the other such circuit containing a pair of series connected condensers, and terminals for connecting one of the circuits to be metered between one pair of rectifiers and the pair of condensers and the other circuit to be metered between the other pair of rectifiers and said pair of condensers, said two rectifier circuits being connected to send currents in opposite directions through said measuring instrument.

4. Rectifier apparatus for measuring the alternating current power consumed by a load impedance comprising a rectifier measuring network comprising four parallel circuits, one such circuit containing a direct current measuring instrument, two such circuits each containing a pair of rectifiers connected in series for the same direction of current flow and the other such circuit containing a pair of series connected condensers, resistances connected in shunt and in series with the load impedance the power consumption of which is to be measured for obtaining two measurement voltages corresponding to the sum and difference respectively of the voltage across and current through such load impedance, and connections between said resistances and the rectifier measuring network for applying said measurement voltages to said rectifier network so that rectified voltages proportional to the square of said measurement voltages are applied to the measuring instrument, said two rectifier circuits of the rectifier network being connected to apply said two rectified voltages to the measuring instrument in opposition.

ROBERT KEITLEY.

REFERENCES CITED

The following references are of record in the file of this patent:

UNITED STATES PATENTS

| Number | Name | Date |
| --- | --- | --- |
| 1,871,710 | Lenehan | Aug. 16, 1932 |
| 1,964,141 | Rhodes et al. | June 26, 1934 |
| 2,059,594 | Massa | Nov. 3, 1936 |
| 2,301,115 | Gilbert | Nov. 3, 1942 |